D. G. RUPLEY
3,404,222
COLOR TELEVISION RECEIVER WITH
BUILT-IN DOT GENERATOR
Original Filed Dec. 9, 1963
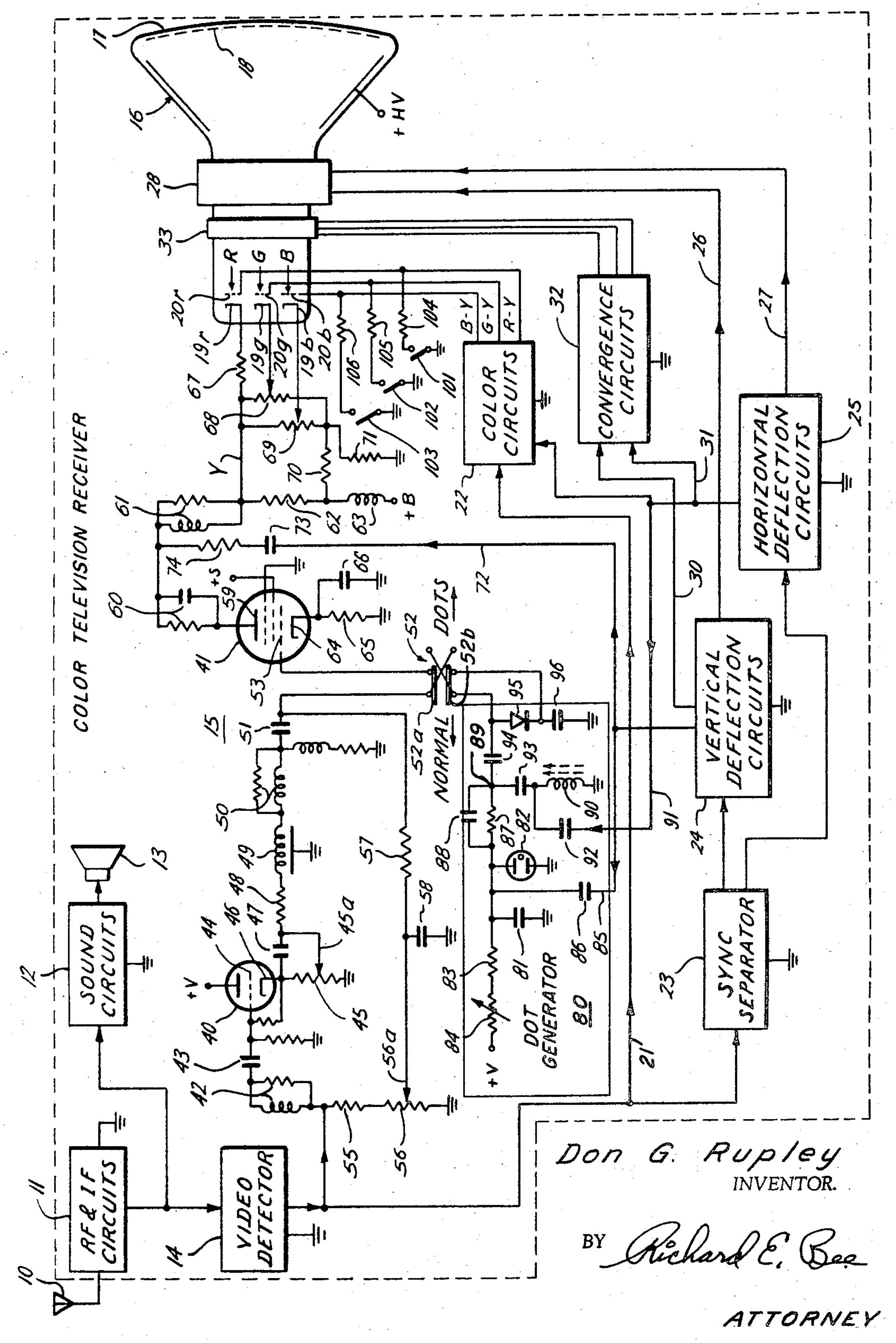
Don G. Rupley
INVENTOR.
BY Richard E. Bee
ATTORNEY 3,404,222
Patented Oct. 1, 1968

3,404,222

COLOR TELEVISION RECEIVER WITH BUILT-IN DOT GENERATOR

Don G. Rupley, St. Joseph, Mich., assignor to Heath Company, St. Joseph, Mich., a corporation of Delaware Continuation of application Ser. No. 665,938, Sept. 6, 1967, which is a continuation of application Ser. No. 329,098, Dec. 9, 1963. This application Feb. 20, 1968, Ser. No. 706,991
9 Claims. (Cl. 178—5.4)

ABSTRACT OF THE DISCLOSURE

The disclosed invention relates to a color television receiver with a built-in test signal circuit for producing an ordered array of dots on the picture tube and additionally providing a direct current reference level. Included are switch means for selectively alternatively connecting either the test signal or regular video signals to the receiver.

This application is a continuation of application Ser. No. 665,938, filed Sept. 6, 1967, now abandoned, which was a continuation of application Ser. No. 329,098, filed Dec. 9, 1963, and now abandoned.

In order to produce a pleasing television picture, it is necessary that the television receiver be in the proper state of adjustment. Some of these adjustments are difficult to make without the use of special test equipment or the reception of special test patterns. Adjustments of this type are usually made at the factory or at the dealer's place of business prior to installation in the viewer's home. Unfortunately, however, the performance of some of the circuits in the television receiver may change with time or other circumstances may arise which require readjustment of some of these more difficult adjustments. In such cases, the appropriate test equipment or test pattern is not always readily available.

This problem is particularly troublesome in the case of color television receivers. Among other things, a greater number of factory-type or serviceman-type adjustments are required in color receivers and some of these adjustments are rather sensitive and rather susceptible to undesired changes. A good example of this type of situation is the convergence adjustments required in color receivers of the type using a three-gun shadow-mask type of picture tube. In this case, it is necessary that the three electron beams converge upon and pass through the same hole in the shadow mask at any given instant in the raster scanning process. Otherwise, the color purity of portions of the reproduced image may be impaired. Since the holes in the shadow mask are rather small and rather closely spaced, the convergence adjustments are rather sensitive in nature. In fact, they are so sensitive that they may be disturbed merely by moving the color receiver from one location to another in the same room. One reason for this is that the electron beams in the picture tube are influenced by the earth's magnetic field and any substantial change in the orientation of the picture tube with respect to such field may disturb the convergence of the beams. Consequently, it is rather probable that it will sometimes be necessary to readjust the beam convergence. The necessary readjustments are, however, difficult to make without the use of special test equipment for generating special test signals or test patterns. Since the average set owner will probably not have the appropriate test equipment at hand, this will necessitate a call to the serviceman, together with its attendant expenses.

Another situation where adjustment problems are encountered is where television receivers are sold in kit form. In this case, the purchaser buys a kit of parts from which he himself constructs the television receiver. This usually requires that he make many of his own circuit adjustments. In some cases, however, he may not possess the necessary test equipment. This is particularly true in the case of color receivers.

It is an object of the invention, therefore, to provide a new and improved television receiver having a built-in test circuit for facilitating adjustment of the receiver.

It is another object of the invention to provide a new and improved television receiver having a built-in test signal generator of relatively economical and uncomplicated construction which, to a great extent, makes use of the circuits normally present in the receiver.

It is a further object of the invention to provide a new and improved color television receiver having a built-in dot signal generator for facilitating convergence adjustments in the receiver.

It is an additional object of the invention to provide a new and improved color television receiver which may be sold in kit form without requiring the purchase of additional test equipment for adjusting the receiver after its assembly.

In accordance with the inventionn, a television receiver comprises a cathode-ray tube having an image screen and means for producing an electron beam. The television receiver also includes vertical and horizontal deflection circuit means for causing the electron beam to scan the image screen. The television receiver further includes circuit means coupled to at least one of the deflection circuit means for producing a test signal. The television receiver also includes circuit means for supplying the test signal to the beam producing means for controlling the inntensity of the electron beam, thereby to produce a test pattern on the image screen.

For a better understanding of the present invention, together with other and further objects thereof, reference is had to the following description taken in connection with the accompanying drawings, the scope of the invention being pointed out in the appended claims.

The single figure of the drawing is a circuit diagram, partly schematic, of a representative embodiment of a television receiver constructed in accordance with the present invention.

Referring to the drawing, there is shown a circuit diagram of a complete color television receiver. This color receiver includes an antenna 10 for intercepting a transmitted television signal and R.F. and I.F. circuits 11 for amplifying this signal and changing the frequency of its carrier to an I.F. value. The sound component of the composite I.F. signal is processed by sound circuits 12 to provide a suitable audio signal for a loudspeaker 13. The video modulation component of the I.F. carrier is detected by a video detector 14 and reproduced at the output thereof. This detected video signal is a unidirectional signal of negative polarity. The monochrome portion of the detected video signal is supplied by way of a video amplifier section 15 to a picture tube or cathode-ray tube 16. Cathode-ray tube 16 is of the three-gun shadow-mask type. It includes a tri-color image screen 17, a shadow mask 18, and three electron guns, designated generally as R, G, and B, for producing separate red, green, and blue electron beams. Among other things, the red electron gun R includes a cathode **19*r* and a control electrode 20*r*, while the green gun G includes a cathode 19*g* and control electrode 20*g* and the blue gun B includes a cathode 19*b* and a control electrode 20*b*. The color subcarrier portion of the detected video signal is supplied by way of conductor 21 to color circuits 22 and is processed by such circuits to produce individual red, green, and blue color-difference signals which are, in turn, supplied to corresponding ones of the control electrodes 20*r*, 20*g*, and 20*b***.

The composite video signal at the output of detector 14 is also supplied to a sync separator circuit 23. Sync separator 23 separates the synchronizing pulse portion of the video waveform from the remainder of the video detector output signal. These synchronizing pulses are used to synchronize the operation of vertical deflection circuits 24 and horizontal deflection circuits 25, which circuits are operative to generate, respectively, the necessary vertical and horizontal deflection signals. The vertical and horizontal deflection signals are supplied by way of conductors 26 and 27, respectively, to a deflection yoke 28 located on the neck of the cathode-ray tube 16. These signals drive the deflection yoke 28 so as to cause the three electron beams to scan the image screen 17 in the usual raster pattern. In accordance with the television broadcasting standards in this country, the vertical deflection circuits 24 are operating in a repetitive or recurrent manner at a frequency of 60 cycles per second, while the horizontal deflection circuits are operating in a repetitive or recurrent manner at a frequency of 15,750 cycles per second.

Vertical deflection signals and horizontal retrace signals are supplied by way of conductors 30 and 31, respectively, to convergence circuits 32. Convergence circuits 32 drive a convergence yoke 33 located on the neck of the cathode-ray tube 16 and serve to provide for dynamic convergence of the three electron beams as they scan the image screen 17.

Considering the video amplifier section 15 in greater detail, this section includes a cathode follower stage associated with a tube 40 and an amplifier or output stage associated with a tube 41. The A.C. component of the monochrome signal appearing at the output of video detector 14 is supplied by way of a peaking network 42 and a coupling condenser 43 to the control electrode 44 of the cathode follower tube 40. This signal is reproduced across an adjustable potentiometer 45 coupled to the cathode 46 of tube 40. Sliding tap 45*a* of potentiometer 45 provides a contrast control for the reproduced image. Condenser 47 provides frequency compensation for the contrast control. The A.C. component appearing at the sliding tap 45*a* is supplied by way of a resistor 48, a delay line 49, a peaking network 50, a coupling condenser 51, and a double-pole double-throw switch 52 to the control electrode 53 of amplifier tube 41. Switch 52 is of the slide type and is connected in the manner of a reversing switch. In the switch position shown in the drawing (designated as "normal"), the coupling condenser 51 is connected directly to the control electrode 53 by way of a switch member 52*a*.

At the same time, the D.C. component of the monochrome signal is supplied by way of a resistor 55, an adjustable potentiometer 56, a resistor 57, and the same switch 52 to the control electrode 53 of output tube 41. Sliding tap 56*a* of potentiometer 56 provides a brightness control for adjusting the brightness of the reproduced image. Condenser 58 serves to bypass A.C. signal components to ground.

The anode 59 of output tube 41 is connected by way of a coupling network 60, a peaking network 61, a load resistor 62, and a decoupling inductor 63, to a positive supply voltage source +B. The cathode 64 of tube 41 is connected to ground by way of a biasing resistor 65 which is shunted by a bypass condenser 66. The amplified video signal appearing across the load resistor 62 is applied to the cathodes 19*r*, 19*g*, and 19*b* of each of the red, green, and blue electron guns of the cathode-ray tube 16. In particular, this signal is supplied by way of a fixed resistor 67 to the red cathode 19*r* and by way of adjustable potentiometers 68 and 69 to the green and blue cathodes 19*g* and 19*b*, respectively. Potentiometers 68 and 69 enable adjustment of the signal drive for the green and blue guns so that only a black-and-white image will be produced when the received signal is not a color signal.

Vertical deflection signals are also supplied by way of a conductor 72, a condenser 73, and a resistor 74 to the cathodes of each of the electron guns for purposes of cutting off the electron beams during vertical retrace intervals.

In order to achieve the objectives of the present invention, the color television receiver under consideration also includes circuit means coupled to at least one of the vertical and horizontal deflection circuits for producing a test signal. This circuit means includes a "test signal" circuit section 80 which includes a first oscillatory circuit for producing a first test signal having a recurrence rate which is a multiple of the vertical deflection frequency. This oscillatory circuit is in the form of a relaxation oscillator circuit and includes a condenser 81, a neon glow tube 82, a fixed resistor 83, and a variable resistor 84, the latter being connected to a source of positive voltage +V. Oscillations are generated by the periodic charging and discharging of the condenser 81. In particular, the condenser 81 is charged by current flow from the source +V through the resistors 84 and 83 until a voltage level is reached at which the glow tube 82 becomes conductive. Conduction in the glow tube 82 rapidly discharges the condenser 81, whereupon the conduction ceases and the condenser 81 begins to charge again.

The frequency of oscillation of this relaxation oscillator may be adjusted by varying the resistance value of the resistor 84. Resistor 84 is adjusted to provide oscillation at a multiple of the vertical deflection frequency. Assume, for example, that oscillation is desired at the 15th multiple or harmonic. Then, for a vertical deflection frequency of 60 cycles per second, the relaxation oscillator is set to oscillate at a frequency of 900 cycles per second.

In order to synchronize the operation of the relaxation oscillator with the vertical deflection of the electron beams, vertical deflection signals from the vertical deflection circuits 24 are supplied by way of a conductor 85 and a coupling condenser 86 to the junction point between the condenser 81 and the glow tube 82. These 60 cycle deflection signals periodically control the discharge of the glow tube 82 so that the 900 cycle oscillations will be spaced in the same manner for the different vertical deflection intervals. The 900 cycle signal generated by the relaxation oscillator is supplied by way of a network formed by a resistor 87 and a condenser 88 to a common circuit point 89.

The test signal section 80 also includes second oscillatory circuit means for producing a second test signal having a recurrence rate which is a multiple of the horizontal deflection frequency. This second oscillatory circuit means is formed by a resonant ringing coil 90 which is tuned to the desired multiple or harmonic of the horizontal deflection frequency. Assuming that the ringing coil 90 is tuned to the 15th harmonic, then for a horizontal deflection frequency of 15,750 cycles per second this means that the ringing coil 90 is tuned to a frequency of approximately 236 kilocycles per second. Ringing coil 90 is provided with an adjustable core for enabling adjustment of the resonant frequency thereof so that, among other things, a harmonic other than the 15th may be selected if desired. Horizontal retrace signals generated in the horizontal deflection circuits 25 are applied across the ringing coil 90 by way of conductor 91 and a coupling condenser 92. Each horizontal retrace pulse excites the ringing coil 90 to produce a train of ringing pulses or oscillations at the selected harmonic frequency. In other words, each horizontal retrace pulse causes the coil 90 to oscillate or ring at the selected harmonic frequency for an extended interval of time. Since the retrace pulses occur at a fairly rapid rate and since the ringing coil 90 is constructed to have a fairly high "Q," the amplitude of the ringing signal remains fairly constant. The ringing signal is properly synchronized with the horizontal deflection of the electron beams such that the cycles of the ringing signal occupy the same relative positions in successive horizontal deflection intervals because the horizontal retrace signals are in step with the horizontal deflection of the electron beams. The ringing signal developed across coil 90 is coupled by way of a coupling condenser 93 to the common circuit point 89.

The test signal section 80 also includes circuit means for combining the signals produced by the relaxation oscillator and the ringing coil 90 for developing a composite test signal. This circuit means includes a direct-current restorer circuit having an input coupled to the common circuit point 89 and, hence, to both the relaxation oscillator circuit and the ringing coil. This direct-current restorer circuit includes a condenser 94, a diode 95, and a condenser 96. When the switch 52 is in the opposite position from that shown in the drawings (which opposite position is designated as the "dots" position), then the output of the restorer circuit, namely, the junction point between the condenser 94 and the diode 95, is coupled by way of switch member **52*a* and the amplifier tube 41 to the cathodes 19*r*, 19*g*, and 19*b* of the three electron guns of the cathode-ray tube 16. When switch 52 is in the "dots" position, a direct-current bias signal is applied to the condenser 96 for establishing the direct-current restoration level of the restorer circuit. This bias signal is obtained by connecting the D.C. brightness control signal appearing at the sliding tap 56*a* of the brightness control potentiometer 56 directly to the condenser 96. This connection is made by way of the resistor 57 and member 52*b* of the switch 52**.

In order to facilitate various adjustments therein, the color receiver also includes circuit means for selectively disabling at least one of the electron guns of the cathode-ray tube 16. This disabling circuit means is represented by a trio of switches 101, 102, and 103 which are individually connected by way of respective ones of resistors 104, 105, and 106 to the control electrodes **20*r*, 20*g*, and 20*b* of the three electron guns. The other terminals of the switches 101, 102, and 103 are connected to chassis ground. Closure of any one of the switches 101, 102, and 103** will disable the corresponding one of the red, green, and blue electron guns so that no beam will be produced by that gun.

Considering the operation of the above-described color television receiver, it is seen that such receiver is provided with two distinct operating modes. The operating mode prevailing at any given moment is determined by the setting of the switch 52. When the switch 52 is the position shown in the drawing, the receiver is in a "normal" operating mode. In this case, it functions in a normal manner to reproduce the televised image on the image screen 17 of cathode-ray tube 16. In this mode, the junction point between condenser 51 and resistor 57 is connected directly to the control electrode 53 of output tube 41 by way of switch member **52*a*. As a result, both the monochrome portion of the detected image signal and the brightness control signal appearing at the sliding tap of potentiometer 56 are supplied directly by way of the output tube 41 to the cathodes 19*r*, 19*g*, and 19*b* of the cathode-ray tube 16 and operate to produce the monochrome portion of the televised image on the image screen 17. In the case of a color broadcast, the coloring components are processed by the color circuits 22 and supplied to the control electrodes 20*r*, 20*g*, and 20*b*** to add color to the reproduced image. Otherwise, the reproduced image will be a monochrome or black-and-white image.

During this "normal" operating mode, the diode 95 in the test signal section 80 is effectively shorted out by means of member **52*b* of switch 52. As a consequence, any test signal components will be bypassed to ground by way of condenser 96**.

The second operating mode for the receiver may, for convenience, be termed a "test" mode. To obtain this mode, the switch 52 is set to the opposite position from that shown in the drawings. This serves to disconnect the monochrome signal and instead connect the output of the test signal section 80 to the input of amplifier tube 41. This enables a desired test pattern to be produced on the image screen 17. In the present embodiment, such test pattern is in the form of rows and columns of dots. For the case where both the relaxation oscillator and the ringing coil 90 are set to operate at the 15th harmonic, the dot pattern will include 15 horizontal rows and 15 vertical columns of dots.

In this "test" mode or "dots" mode, the junction point between condenser 51 and resistor 57 will be connected by way of switch member **52*b* to the junction point between diode 95 and condenser 96. This accomplishes two purposes. It bypasses the A.C. monochrome components to ground by way of condenser 96. It also applies the D.C. brightness control signal to the condenser 96 for establishing the D.C. restoration level for the D.C. restorer circuit. At the same time, the output of the restorer circuit, which corresponds to the junction point between condenser 94 and diode 95, is connected by way of switch member 52*a* to the control electrode 53 of output tube 41**.

Assuming that 15th harmonic operation prevails, then the 900 cycle recurrent signal generated by the relaxation oscillator formed by condenser 81, glow tube 82, and resistors 83 and 84 is supplied by way of the switch 52 and output tube 41 to the three cathodes **19*r*, 19*g*, and 19*b* of cathode-ray tube 16. This signal alone would cause 15 horizontal bars to appear on the face of the image screen 17. This occurs because 15 cycles of the 900 cycle signal occur during each vertical deflection interval. By properly adjusting the brightness control tap 56*a* and, hence, the D.C. level for the 900 cycle signal as it is applied to the control electrode 53, the circuit may be operated so that only the peaks of the 900 cycle signal will be effective to turn on the electron beams in the cathode-ray tube 16**. In this manner, the 15 horizontal bars may be made to be relatively narrow in a vertical direction.

The 15th harmonic signal developed across the ringing coil 90, on the other hand, since it is at a multiple of the horizontal deflection frequency, is effective to turn on the electron beams at 15 regularly spaced intervals during each horizontal sweep of the beams. In the absence of the 900 cycle signal, this would produce 15 vertical bars on the image screen 17. By proper adjustment of the brightness control tap **56*a*** so that only the peaks of the ringing coil signal are effective to turn on the electron beams, these vertical bars may be made to be quite narrow in width.

In the present embodiment, the 15th harmonic ringing coil signal (a 236 kilocycle signal) is superimposed on the 900 cycle relaxation oscillator signal by supplying both signals to a common output circuit represented, in this embodiment, by the restorer circuit formed by diode 95 and condensers 94 and 96. In this case, the brightness control tap **56*a* is set so that only the peaks of the ringing coil signal which occur during the peaks of the 900 cycle signal will be effective to turn on the electron beams in the cathode-ray tube 16. Thus, 15 times during each vertical sweep, the electron beams will be turned on and off at the ringing coil rate for a few successive horizontal sweeps. This produces a dot pattern on the image screen 17. The size of the dots may be varied somewhat by adjusting the brightness control tap 56*a***.

This dot-type test pattern is particularly useful for adjusting the convergence of the three electron beams of the cathode-ray tube 16. To do this, the receiver is tuned to a station broadcasting a monochrome or black-and-white program. The switch 52 is set to the "dots" position (the opposite of that shown in the drawing). The brightness control tap **56*a* is adjusted so that the dots on the image screen 17 are of relatively small size. The sharpness and stability of the dots may be further improved, if necessary, by adjustment of the variable resistor 84 and the adjustable core of the ringing coil 90. One of the electron beams is then disabled by closing one of the switches 101, 102, and 103. For example, the blue beam is cut off by closing the switch 103. The static or D.C. convergence controls of the convergence yoke 33 are then adjusted to merge the red and green dots appearing at the center of the image screen 17 to form yellow dots. Switch 103 is then opened and the blue dots are merged with the yellow dots to obtain white dots in the center area of the image screen 17. This same type of process is then repeated for the dynamic convergence adjustments, the adjustable elements in this case being located in the convergence circuits 32. The dynamic convergence adjustments are, however, somewhat more involved since the adjustment process must be repeated for different areas near the edges of the image screen 17**.

After the various receiver adjustments, including the convergence adjustments, have been completed and with the switch 52 back in the "normal" position, the color television receiver will function to reproduce satisfactory television images, either color or black-and-white, on the image screen 17. Anytime the receiver convergence, for example, gets out of adjustment and re-adjustment is required, such re-adjustment may be made by the set owner himself by returning the receiver to the "test" mode. Thus, with a television receiver incorporating the features of the present invention, the set owner himself may make many of the more difficult adjustments without need for calling in a serviceman or repairman.

While it is not intended to limit the invention to any particular design constants, the following values have been found suitable for the circuits associated with the test signal section of the receiver:

| | | |
|---|---|---|
| Condenser **81** | microfarads | 0.001 |
| Condenser **86** | micromicrofarads | 20 |
| Condenser **88** | do | 220 |
| Condenser **92** | do | 33 |
| Condenser **93** | do | 20 |
| Condenser **94** | microfarads | 0.005 |
| Condenser **96** | do | 0.1 |
| Resistor **83** | megohms | 2.2 |
| Resistor **84** | do | 0 to 1.0 |
| Resistor **87** | kilohms | 220 |
| Tube **41** | | type 12GN7 |
| Glow Tube **82** | | type NE-2 |
| Diode **95** | | type 1N295 |
| Voltage +V | volts | +275 |
| Voltage +B | do | +390 |

While there has been described what is at present considered to be the preferred embodiment of this invention, it will be obvious to those skilled in the art that various changes and modifications may be made therein without departing from the invention, and it is, therefore, intended to cover all such changes and modifications as fall within the true spirit and scope of the invention.

I claim:

1. A television receiver having a dot pattern signal generator as a permanent integral part thereof comprising:
a cathode-ray tube having an image screen and means for producing an electron beam;
vertical and horizontal deflection circuit means for causing the electron beam to scan the image screeen;
first oscillatory circuit means for producing a recurrent signal at a multiple of the vertical deflection frequency;
circuit means for supplying a recurrent vertical deflection circuit signal to the first oscillatory circuit means for synchronizing the operation thereof with the vertical deflection of the electron beam;
second oscillatory circuit means for producing a recurrent signal at a multiple of the horizontal deflection frequency;
circuit means for supplying a recurrent horizontal deflection circuit signal to the second oscillatory circuit means for synchronzing the operation thereof with the horizontal deflection of the electron beam;
circuit means responsive to the signals produced by the first and second oscillatory circuit means for developing a composite test signal;
a source of direct current within the television receiver;
and circuit means permanently within the television receiver for coupling said direct current source and said composite test signal to the beam producing means for controlling the intensity of the electron beam.

2. A test signal circuit within a television receiver comprising:
a cathode-ray tube having an image screen and means for producing an electron beam;
vertical and horizontal deflection circuit means for causing the electron beam to scan the image screen;
relaxation oscillator circuit means for producing a recurrent signal at a multiple of the vertical deflection frequency;
circuit means for supplying a recurrent vertical deflection circuit signal to the relaxation oscillator circuit means for synchronizing the operation thereof with the vertical deflection of the electron beam;
resonant ringing circuit means tuned to a multiple of the horizontal deflection frequency;
circuit means for supplying a recurrent horizontal deflection circuit signal to the resonant ringing circuit means for producing a recurrent ringing signal which is synchronized with the horizontal deflection of the electron beam;
circuit means for combining the signals produced by the relaxation oscillator and the resonant ringing circuit means for developing a composite test signal;
and circuit means for supplying the composite test signal to the beam producing means for controlling the intensity of the electron beam.

3. A television receiver comprising:
a cathode-ray tube having an image screen and means for producing an electron beam;
vertical and horizontal deflection circuit means for causing the electron beam to scan the image screen;
a relaxation oscillator circuit for producing a recurrent signal at a multiple of the vertical deflection frequency;
circuit means for supplying vertical deflection signals to the relaxation oscillator circuit for synchronizing the operation thereof;
resonant ringing circuit means tuned to a multiple of the horizontal deflection frequency;
circuit means for supplying horizontal retrace signals to the ringing circuit means;
direct-current restorer circuit means having an input coupled to both the oscillator circuit and the ringing circuit means;
monochrome video amplifier circuit means for supplying a controllable direct-current bias signal to the restorer circuit means for establishing the direct-current restoration level thereof;
and circuit means for coupling the output of the restorer circuit means to the cathode-ray tube beam producing means for controlling the intensity of the electron beam.

4. A television receiver comprising:
a cathode-ray tube having an image screen and means for producing an electron beam;
vertical and horizontal deflection circuit means for causing the electron beam to scan the image screen;
circuit means for detecting a received image signal;
adjustable brightness control means for supplying a direct-current signal for controlling the brightness of the image screen;
a relaxation oscillator circuit for producing a recurrent signal at a multiple of the vertical deflection frequency;
circuit means for supplying vertical deflection signals to the relaxation oscillator circuit for synchronizing the operation thereof;

resonant ringing circuit means tuned to multiple of the horizontal deflection frequency;
circuit means for supplying horizontal retrace signals to the ringing circuit means;
direct-current restorer circuit means having an input coupled to both the oscillator circuit and the ringing circuit means;
and circuit means having a first operating mode for supplying the detected image signal and the brightness control signal to the cathode-ray tube beam producing means and a second operating mode for supplying the brightness control signal to the restorer circuit means for establishing the direct-current restoration level thereof and for coupling the output of the restorer circuit means to the cathode-ray tube beam producing means and including switching means for selecting the operating mode.

5. A color television receiver comprising:
a cathode-ray tube having a tri-color image screen and means for producing three electron beams;
vertical and horizontal deflection circuit means for causing the electron beams to scan the image screen;
circuit means for detecting a received image signal;
adjustable brightness control means responsive to the detected image signal for developing a direct-current signal for controlling the brightness of the image screen;
a relaxation oscillator circuit for producing a recurrent signal at a multiple of the vertical deflection frequency;
circuit means for supplying vertical deflection signals to the relaxation oscillator circuit for synchronizing the operation thereof;
resonant ringing circuit means tuned to a multiple of the horizontal deflection frequency;
circuit means for supplying horizontal retrace signals to the ringing circuit means;
direct-current restorer circuit means having an input coupled to both the oscillator circuit and the ringing circuit means;
circuit means having a first operating mode for supplying the detected image signal and the brightness control signal to the cathode-ray tube beam producing means for controlling the intensities of the electron beams and a second operating mode for supplying the brightness control signal to the restorer circuit means for establishing the direct-current restoration level thereof and for coupling the output of the restorer circuit means to the cathode-ray tube beam producing means for controlling the intensities of the electron beams and including switching means for selecting the operating mode;
and circuit means for selectively disabling at least one of the electron beams.

6. A dot pattern generator for permanent installation within a color television receiver wherein the receiver has horizontal and vertical deflection circuits for producing scanning signals and a monochrome video amplifier circuit for separating an image signal into direct and alternating components comprising:
circuit means for installation within the television receiver to produce a first test signal having a recurrence rate which is a multiple of the vertical deflection frequency;
means for coupling the first test signal circuit means to the vertical deflection circuit;
circuit means for installation within the television receiver to produce a second test signal having a recurrence rate which is a multiple of the horizontal deflection frequency;

means for coupling the second test signal circuit means to the horizontal deflection circuit;
further circuit means for coupling a direct current derived from the image signal to the first and second test signal circuit means to generate dot pattern signals;
and switch means for installation within the color television receiver to selectively connect and disconnect the first and second test signal circuit means to the monochrome video amplifier circuit.

7. A television receiver comprising:
a color picture tube having a plurality of control electrodes;
video signal circuit means coupled to said control electrodes to regulate the brightness of an image on a surface of said picture tube in response to said video signal;
a test signal circuit permanently combined with the television receiver for producing an alternating current test signal to establish an ordered array on said picture tube surface and additionally providing a direct current reference level;
and switch means for selectively disconnecting said video circuit means from said control electrodes and coupling said alternating current test signal circuit thereto to produce said ordered array on said picture tube surface.

8. A color television receiver according to claim 7 wherein said switch means comprises a contact for selectively coupling said video circuit means to said test signal circuit when it is not connected to the control electrodes.

9. A television receiver comprising:
a chassis;
a color picture tube having at least one control electrode;
video circuit means coupled to said control electrode to produce at least one electron beam to establish an image on a surface of said picture tube;
vertical and horizontal deflection circuit means for causing said electron beam to scan said picture tube surface;
first test circuit means mounted on said chassis for response to said vertical deflection circuit means;
second test circuit means mounted on said chassis for response to said horizontal deflection circuit means and said first test circuit means to establish a test pattern on said picture tube; and
further circuit means mounted on said chassis to apply a direct current reference from said video circuit means to said test circuit means.

References Cited

UNITED STATES PATENTS

| | | | |
|---|---|---|---|
| 2,818,526 | 12/1957 | Meagher et al. | 178—67 |
| 2,855,515 | 10/1958 | Bernard | 178—5.2 |
| 2,956,116 | 10/1960 | Singelman | 178—6 |
| 2,978,540 | 4/1961 | Coate et al. | 178—6 |
| 3,114,796 | 12/1963 | Stark et al. | 178—5.4 |

OTHER REFERENCES

"Dot Pattern Generator for Color and Monochrome," Radio and Television News, September 1954, pages 45–47, 134 and 135.

ROBERT L. GRIFFIN, *Primary Examiner.*

R. MURRAY, *Assistant Examiner.*